(12) United States Patent
Badgwell et al.

(10) Patent No.: US 11,131,181 B2
(45) Date of Patent: Sep. 28, 2021

(54) CONTROLLER WITH AUTOMATIC TUNING AND METHOD

(71) Applicants: Thomas A. Badgwell, Clinton, NJ (US); Paul E. Pastusek, The Woodlands, TX (US); Krishnan Kumaran, Raritan, NJ (US); David J. Schmidt, Morristown, NJ (US)

(72) Inventors: Thomas A. Badgwell, Clinton, NJ (US); Paul E. Pastusek, The Woodlands, TX (US); Krishnan Kumaran, Raritan, NJ (US); David J. Schmidt, Morristown, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 263 days.

(21) Appl. No.: 16/133,941

(22) Filed: Sep. 18, 2018

(65) Prior Publication Data

US 2019/0106976 A1 Apr. 11, 2019

Related U.S. Application Data

(60) Provisional application No. 62/665,350, filed on May 1, 2018, provisional application No. 62/569,799, filed on Oct. 9, 2017.

(51) Int. Cl.
*E21B 44/02* (2006.01)
*G05B 11/42* (2006.01)
(Continued)

(52) U.S. Cl.
CPC ............ *E21B 44/02* (2013.01); *E21B 45/00* (2013.01); *G05B 11/42* (2013.01); *G05B 13/021* (2013.01)

(58) Field of Classification Search
None
See application file for complete search history.

(56) References Cited

U.S. PATENT DOCUMENTS 4,507,735 A 3/1985 Moorehead et al.
4,736,297 A 4/1988 LeJeune
(Continued)

FOREIGN PATENT DOCUMENTS

WO WO 2014/055352 A1 4/2014
WO WO 2016/108855 A1 7/2016

OTHER PUBLICATIONS

Astrom et al. (1995) "PID Controllers: Theory, Design, and Tuning", ISA, p. 64.

*Primary Examiner* — Eman A Alkafawi
*Assistant Examiner* — Denise R Karavias
(74) *Attorney, Agent, or Firm* — ExxonMobil Upstream Research Company—Law Department

(57) ABSTRACT

A method and controller system are described for automatically tuning a controller of a drilling rig. The controller system includes a controller that determines a moving average of measured values, determines a moving standard deviation of the measured values, defines an outer zone of measured values with the determined moving average and the determined moving standard deviation, defines an inner zone of measured values with the determined moving average and the determined moving standard deviation, monitors the measured values for the occurrence of statistical events with respect to the outer zone and inner zone. Based on the detected statistical event, the controller adjusts the gain of the controller the based on the statistical event being associated with the outer zone or inner zone.

20 Claims, 5 Drawing Sheets

(51) Int. Cl.
*E21B 45/00* (2006.01)
*G05B 13/02* (2006.01)

(56) References Cited

U.S. PATENT DOCUMENTS

| | | |
|---|---|---|
| 5,551,286 A | 9/1996 | Booer |
| 5,568,377 A * | 10/1996 | Seem .................. G05B 11/42 |
| | | 700/28 |
| 5,730,234 A | 3/1998 | Putot |
| 5,842,149 A | 11/1998 | Harrell et al. |
| 6,026,912 A | 2/2000 | King et al. |
| 6,155,357 A | 12/2000 | King et al. |
| 6,192,998 B1 | 2/2001 | Pinckard |
| 6,293,356 B1 | 9/2001 | King et al. |
| 6,382,331 B1 | 5/2002 | Pinckard |
| 6,408,953 B1 | 6/2002 | Goldman et al. |
| 6,424,919 B1 | 7/2002 | Moran et al. |
| 6,443,242 B1 | 9/2002 | Newman et al. |
| 6,480,118 B1 | 11/2002 | Rao |
| 6,732,052 B2 | 5/2004 | Macdonald et al. |
| 6,820,702 B2 | 11/2004 | Niedermayr et al. |
| 6,892,812 B2 | 5/2005 | Niedermayr et al. |
| 6,959,219 B2 * | 10/2005 | Tanaka .................. G05B 5/01 |
| | | 318/561 |
| 6,968,909 B2 | 11/2005 | Aldred et al. |
| 7,020,597 B2 | 3/2006 | Oliver et al. |
| 7,172,037 B2 | 2/2007 | Dashevskiy et al. |
| 7,261,167 B2 | 8/2007 | Goldman et al. |
| 7,316,278 B2 | 1/2008 | Hutchinson |
| 7,357,196 B2 | 4/2008 | Goldman et al. |
| 7,606,666 B2 | 10/2009 | Repin et al. |
| 7,610,251 B2 | 10/2009 | Shayegi et al. |
| 7,878,268 B2 | 2/2011 | Chapman et al. |
| 7,896,105 B2 | 3/2011 | Dupriest |
| 8,014,987 B2 | 9/2011 | Pabon et al. |
| 2002/0029561 A1 * | 3/2002 | Ueno .................. F01N 11/007 |
| | | 60/277 |
| 2003/0024514 A1 * | 2/2003 | Kitamura .............. F01N 11/007 |
| | | 123/672 |
| 2007/0246241 A1 | 10/2007 | Lowe et al. |
| 2009/0089227 A1 | 4/2009 | Sturrock et al. |
| 2009/0090555 A1 | 4/2009 | Boone et al. |
| 2009/0132458 A1 | 5/2009 | Edwards et al. |
| 2010/0108384 A1 | 5/2010 | Byreddy et al. |
| 2015/0252664 A1 * | 9/2015 | Astrid .................. G05B 13/021 |
| | | 700/275 |
| 2016/0362973 A1 * | 12/2016 | Turner .................. E21B 47/007 |

* cited by examiner

CONTROLLER WITH AUTOMATIC TUNING AND METHOD

CROSS REFERENCE TO RELATED APPLICATIONS

This application claims the benefit of U.S. Provisional Application Ser. No. 62/665,350, filed May 1, 2018 and U.S. Provisional Application Ser. No. 62/569,799, filed Oct. 9, 2017, the disclosures of which are incorporated herein by reference in their entirety.

FIELD OF THE INVENTION

The invention relates to automatic tuning of a PID controller and more particularly automatic tuning of a PID controller of a drilling rig to improve drilling performance and efficiency.
Environment The oil and gas industry incurs substantial operating costs to drill wells in the exploration and development of hydrocarbon resources. The cost of drilling wells may be considered to be a function of time due to the equipment and manpower expenses based on time. The drilling time can be minimized in at least two ways: 1) maximizing the Rate-of-Penetration (ROP) (i.e., the rate at which a drill bit penetrates the earth); and 2) minimizing the non-drilling rig time (e.g., time spent on tripping equipment to replace or repair equipment, constructing the well during drilling, such as to install casing, and/or performing other treatments on the well). Past efforts have attempted to address each of these approaches. For example, drilling equipment is constantly evolving to improve both the longevity of the equipment and the effectiveness of the equipment at promoting a higher ROP. Moreover, various efforts have been made to model and/or control drilling operations to avoid equipment-damaging and/or ROP-limiting conditions, such as vibrations, bit-balling, etc.

Drilling rigs may employ a Proportional-Integral-Derivative (PID) controllers to maintain a desired Weight On Bit (WOB), Rate Of Penetration (ROP) and/or other important quantities during the drilling process.

Before drilling starts, the tuning parameters for the PID controllers may be initialized to settings that are deemed to be appropriate for the anticipated rock formations that the drilling bit will encounter. However the exact nature of the rock formations and performance of the drilling bit are often unknown, making it difficult to initially set the tuning parameters correctly; and even if the tuning parameters are selected appropriately for the initial rock formation, they may not be appropriate for subsequent rock formations encountered by the drilling bit as the drilling operation progresses.

A need has persisted for a controller of a drilling operation to have a capacity to maintain effective and responsive control of a parameter of a drilling operation despite unforeseen changes in rock formations and/or conditions of equipment as a drilling operation progresses.

SUMMARY

An aspect of the present disclosure provides a method of automatically tuning a (PID) controller configured to control toward a desired process value by manipulating a second variable, wherein the method comprises repetitively measuring a value of the desired process value, from the repetitively measuring, determining a moving average of the measured values and determining a moving standard deviation of the measured values, defining an outer zone of measured values with the determined moving average and a first plurality of the determined moving standard deviation, defining an inner zone of measured values with the determined moving average and a second plurality of the resolved moving standard deviation, the first plurality being greater in number than the second plurality, monitoring the measured values for the occurrence of a first statistical event with respect to the outer zone and adjusting a gain of the controller by a first factor upon detection of the first statistical event, monitoring the measured values for the occurrence of a second statistical event with respect to the inner zone and adjusting a gain of the controller by a second factor upon detection of the second statistical event, wherein the first factor differs from the second factor, whereby the controller may be automatically tuned.

The detection of the first statistical event may comprises measuring a first time interval for when a measured value may measure above an upper limit of the outer zone to when another measured value may measure below a lower limit of the outer zone, comparing the first measured time interval against a first predetermined time interval, and should the first measured time interval be less than the first predetermined time interval, adjusting a gain of the controller by the first factor.

The detection of the second statistical event may comprise measuring a second time interval for when a measured value may measure above an upper limit of the inner zone to when another measured value may measure below a lower limit of the inner zone, comparing the second measured time interval against a second predetermined time interval, and should the second measured time interval be less than the second predetermined time interval, adjusting a gain of the controller by the second factor. The first and second factors may decrease a gain of the controller, with the decrease in gain of the first factor being greater than the decrease in gain of the second factor.

The upper limit of the outer zone may be determined by an addition of the first plurality to the determined moving average and the lower limit of the outer zone may be determined by a subtraction of the first plurality from the determined moving average.

The upper limit of the inner zone may be determined by an addition of the second plurality to the determined moving average and the lower limit of the inner zone may be determined by a subtraction of the second plurality from the determined moving average.

The method may further comprise further monitoring the measured values with respect to the inner zone by detecting a third time interval during which measured values remain within the upper and lower limits of the inner zone; and comparing the detected third interval of time to a third predetermined time interval. Upon a finding that the detected third interval of time is greater than the third predetermined time interval, the method may include increasing a gain of the controller by a third factor.

The increase in gain of the third factor may be smaller in magnitude than the decrease in gain of the first factor. The desired process value may represent a rate of progress (ROP) of a drilling rig and the second variable represents a weight on bit (WOB) of a drilling rig.

Another aspect of the present disclosure provides a controller system, comprising a (PID) controller configured to control toward a desired process value by manipulating a second variable, an arrangement in communication with the controller to repetitively measure a value of the desired process value, the controller being configured to execute a routine that, determines a moving average of the measured values, determines a moving standard deviation of the measured values, defines an outer zone of measured values with the determined moving average and a first plurality of the determined moving standard deviation, defines an inner zone of measured values with the determined moving average and a second plurality of the determined moving standard deviation, the first plurality being greater in number than second plurality, monitors the measured values for the occurrence of a first statistical event with respect to the outer zone and adjusting a gain of the controller by a first factor upon detection of the first statistical event, monitors the measured values for the occurrence of a second statistical event with respect to the inner zone and adjusting a gain of the controller by a second factor upon detection of the second statistical event, wherein the first factor differs from the second factor, whereby the controller may be automatically tuned.

In detecting the first statistical event the controller may be configured to execute a routine that: measures a first time interval for when a measured value may measure above an upper limit of the outer zone to when another measured value may measure below a lower limit of the outer zone; compares the first measured time interval against a first predetermined time interval; and should the first measured time interval be less than the first predetermined time interval, adjusting a gain of the controller by the first factor.

In detecting the second statistical event, the controller is configured to execute a routine that measures a second time interval for when a measured value may measure above an upper limit of the inner zone to when another measured value may measure below a lower limit of the inner zone, compares the second measured time interval against a second predetermined time interval; and should the second measured time interval be less than the second predetermined time interval, adjusting a gain of the controller by the second factor. The controller may be further configured to execute a routine that monitors the measured values with respect to the inner zone to detect a third time interval during which measured values remain within the upper and lower limits of the inner zone and compares the detected third interval of time to a third predetermined time interval, and upon a finding that the detected third interval of time is greater than the third predetermined time interval, increases a gain of the controller by a third factor.

The first and second factors may decrease a gain of the controller, with the decrease in gain of the first factor being greater than the decrease in gain of the second factor; and/or the upper limit of the outer zone may be determined by an addition of the first plurality to the determined moving average and the lower limit of the outer zone may be determined by a subtraction of the first plurality from the determined moving average.

The upper limit of the inner zone may be determined by an addition of the second plurality to the determined moving average and the lower limit of the inner zone may be determined by a subtraction of the second plurality from the determined moving average; and/or the increase in gain of the third factor may be smaller in magnitude than the decrease in gain of the first factor. The desired process value may represent a rate of progress (ROP) of the drilling rig and the second variable may represents a weight on bit (WOB) of a drilling rig.

The controller may be configured to produce a displayable control gain recommendation. The controller may be linked to a driver of the drilling rig, whereby the output of the controller may be implemented automatically.

BRIEF DESCRIPTION OF THE DRAWINGS

While the present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present disclosure. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The following drawings are provided, wherein:

DETAILED DESCRIPTION

Reference will now be made to exemplary embodiments and implementations. Alterations and further modifications of the inventive features described herein and additional applications of the principles of the disclosure as described herein, such as would occur to one skilled in the relevant art having possession of this disclosure, are to be considered within the scope of the disclosure. Further, before particular embodiments of the present disclosure are disclosed and described, it is to be understood that this disclosure is not limited to the particular process and materials disclosed herein as such may vary to some degree. Moreover, in the event that a particular aspect or feature is described in connection with a particular embodiment, such aspects and features may be found and/or implemented with other embodiments of the present disclosure where appropriate. Specific language may be used herein to describe the exemplary embodiments and implementations. It will nevertheless be understood that such descriptions, which may be specific to one or more embodiments or implementations, are intended to be illustrative only and for the purpose of describing one or more exemplary embodiments. Accordingly, no limitation of the scope of the disclosure is thereby intended, as the scope of the present disclosure will be defined only by the appended claims and equivalents thereof.

Figure 1:
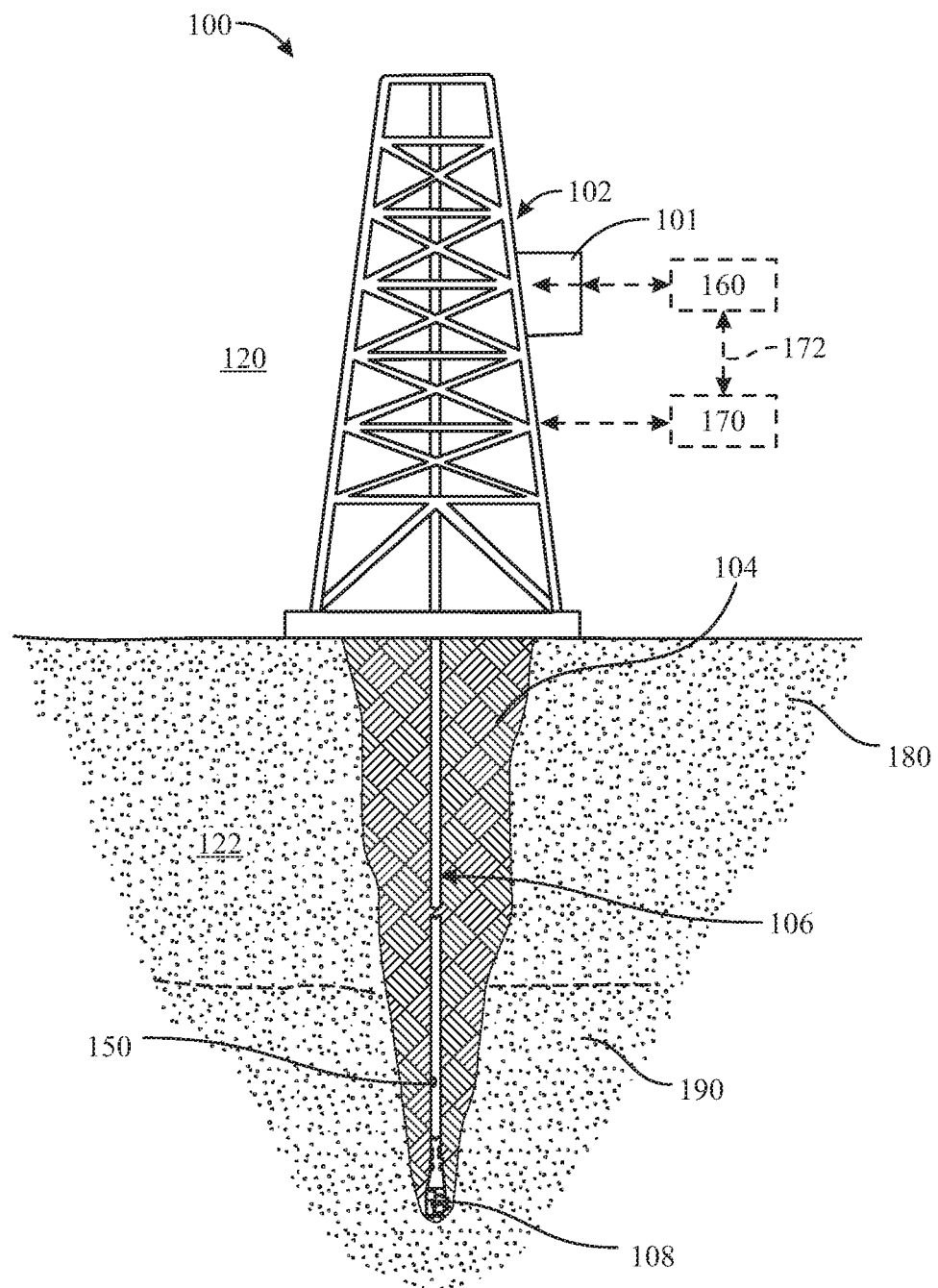
FIG. 1 is a schematic view of a drilling rig and well in which the systems and methods of the present disclosure may be implemented, in accordance with an example embodiment.

FIG. 1 is a side view of a drilling operation at a drill site 100. FIG. 1 illustrates an example of a context in which the present systems and methods may be used. As illustrated, the drill site 100 is a land-based drill site having a drilling rig 102 disposed above a well 104. The drilling rig 102 may include a drill string 106 that includes a drill bit 108 which may be disposed at the end thereof and a drawworks 101 and/or other suitable driver which may be, in the example embodiment, operative upon the drill string 106 to either increase, decrease or maintain a level of weight-on-bit (WOB) at the command and control of a controller 160. In some embodiments, the controller 160 may be linked to a monitor 170.

The drill string 106 may extend within a wellbore 150. The wellbore 150 may extend from a surface region 120 and/or may extend within a subsurface region 122. The subsurface region 122 may include a first (upper rock) formation 180 and a second (lower) rock formation 190. Whereas FIG. 1 illustrates the wellbore 150 as being vertical, or at least substantially vertical, it is within the scope of the present disclosure that the systems and methods described herein also may be utilized in deviated and/or horizontal wellbores. Similarly, the present systems and methods are not limited to land based drilling sites but may be used in connection with offshore, deepwater, arctic, and the other various environments in which drilling operations are conducted.

The controller 160 may be programmed to control the operation of drilling rig 102, such as via performing any of the methods disclosed herein. The monitoring assembly 170 may be configured to monitor a plurality of performance indicators of a drilling operation of the drilling rig 102. Additionally or alternatively, the monitoring assembly 170 also may be configured to provide a plurality of monitoring signals 172 to controller 160. The monitoring signals 172 may be indicative of the plurality of performance indicators (parameters). For example, drilling parameters may include rotary speed (RPM), WOB, characteristics of the drill bit and drill string, mud weight, mud flow rate, lithology of the subterranean formation, pore pressure of the formation, torque, pressure, temperature, ROP, MSE, vibration measurements, etc. As can be understood from the list above, some of the drilling parameters are controllable and others are not. Similarly, some may be directly measured and others must be calculated based on one or more other measured parameters.

For purposes of illustration only and to facilitate an understanding of the methods and apparatus disclosed herein, the embodiment described in the teachings which follow comprises a monitoring assembly 170 which in cooperation with the controller 160 measures/calculates ROP setpoint ($ROP_{SP}$) as the "monitored variable" so as to control the action of the driver 101 according to a controlled variable WOB in a manner which is automatically tuned (self-adjusting) responsively to unforeseen changes drilling conditions and/or equipment that might otherwise cause the control process to become unstable.

The controller 160 of the example embodiment may employ a Proportional-Integral-Derivative (PID) control algorithm to maintain a desired a Weight On Bit (WOB), Rate Of Penetration (ROP) and other important quantities during the drilling operation. While there are many versions of the PID control algorithm, the following "textbook" discrete-time form is representative:

$$u_k = K_c \left[ e_k + (\Delta t / \tau_I) \sum_{j=0}^{\infty} e_{k-j} + (\tau_D / \Delta t)(e_k - e_{k-1}) \right]; e_k = y_{sp} - y_k$$

These equations describe the PID computation at time interval k, with the understanding that it executes at succeeding intervals in time separated by a constant control interval (k, k+1, k+2, etc.). The quantities are (in parantheses for the WOB controller of the example embodiment):

$y_{sp}$=setpoint for controlled variable ($WOB_{SP}$)
$y_k$=current value of controlled variable ($WOB_{CV}$)
$e_k$=controlled variable error (WOB error)
$\Delta t$=control interval
$K_c$=control gain
$\tau_I$=integral time
$\tau_D$=derivative time
$u_k$=manipulated variable (e.g., a spooling rate of the drawworks 101)

The controller 160 executes with a PID controller algorithm to control operation of the drilling rig 102 in a manner that determines how the manipulated variable u is adjusted as the controlled variable y moves. The overall performance of a PID controller operating on a particular process is determined by the values of the tuning parameters $K_c$, $\tau_I$, and $\tau_D$. One of the more important of these is the proportional control gain $K_c$, which determines the aggressiveness of the control action (large magnitude for aggressive control, small magnitude for passive control).

It is important to note that the best values of the tuning parameters $K_c$, $\tau_I$, and $\tau_D$ will be different for each process that the PID control operates upon; and may be determined through a trial and error workflow that is commonly referred to as "tuning" the controller. PID control tuning is a skill that can be obtained through appropriate training and experience. It is to also important to note that when choosing the tuning parameters for a particular process, there may be a tradeoff between control performance (how well the control keeps the controlled variable at its setpoint) and control robustness (how much process variation that can be tolerated before the controller becomes unstable). If the PID controller parameters (the control gain, integral time and derivative time) are chosen incorrectly, the controlled process input can become unstable, i.e., its output diverges (with or without oscillation), and may be limited only by saturation or mechanical breakage. Instability may be caused by excess gain, particularly in the presence of significant lag.

If the control is tuned aggressively it will perform well, but will not be able to tolerate much variation in the process. Likewise, a controller that is de-tuned so that it can tolerate a wide variation in process conditions may not perform as well for any particular process condition.

Before drilling starts, the tuning parameters for the WOB controller may be initialized to settings that are deemed to be appropriate for the anticipated rock formations that the drilling bit 108 will encounter. However the exact nature of the rock formations and performance of the drilling bit may not be known, making it difficult for the operator to set the WOB tuning parameters correctly. For this reason the WOB tuning parameters are often initially set so that the controller 106 will be somewhat robust (having a capacity to tolerate a variation in the drilling process without coming unstable), knowing that this will lead to slower than optimal ROP; and even if the tuning parameters are selected appropriately for the initial rock formation, they may not be appropriate for subsequent rock formations encountered by the drilling bit 108.

Figure 2:
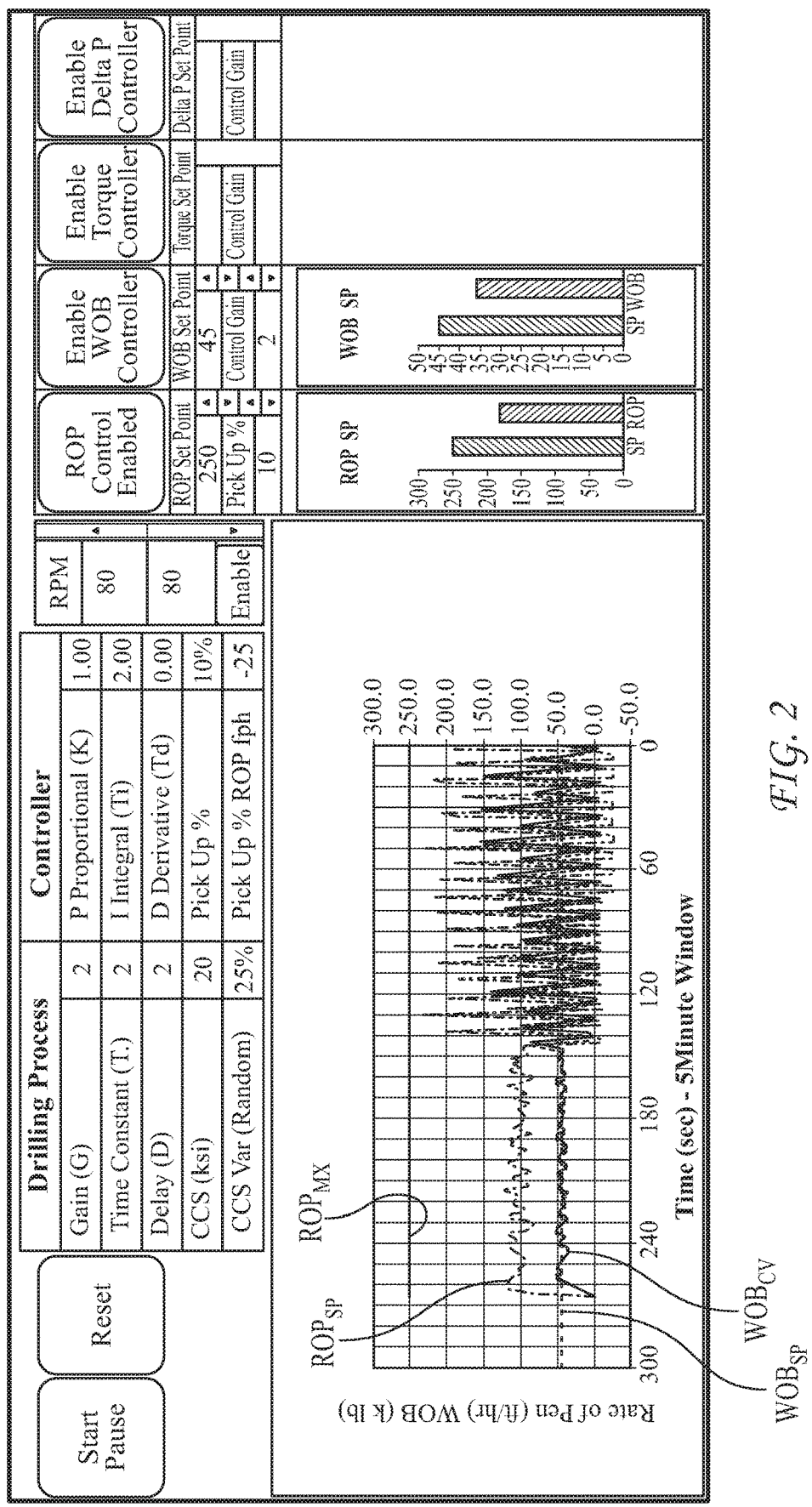
FIG. 2 is a representation of a screen display of operating parameters of a simulated drilling operation being impacted by a change of a condition in a formation, without an implementation of the systems and methods of the present disclosure.

By way of a simulation, FIG. 2 illustrates such a case, wherein a WOB tuning is appropriate for the initial rock formation 180, which by way of example, has a hardness of 10 ksi. However, when the bit enters a new rock formation 190 where the hardness is 20 ksi, for example, the control signal (output of the controller 160) suffers a series of rapid, unattenuated oscillations and the WOB controller in effect, goes unstable. Such instabilities may often go unnoticed by the operator drilling 102, and their cause may seem mysterious to someone who is not skilled in the art of control tuning. In some instances this behavior may be attributed to the unique characteristics of the rock rather than to a poorly tuned controller. This unstable cycling leads to inefficient drilling and if left unchecked, may cause stick-slip and/or ultimately lead to failure of the drilling bit 106.

The present disclosure provides an automatic PID tuning algorithm, system and method for drilling rigs, which is referenced as the Drilling Rig Control Automatic Tuning (DRCAT) which may be configured to monitor the ROP setpoint (ROP$_{SP}$) or other operating parameter and to make appropriate adjustments to the WOB controller gain to speed up or slow down the WOB controller in a manner that avoids instabilities in the output of the controller 160. As a result, drilling operations may proceed more efficiently and at lower operating costs.

Figure 5:
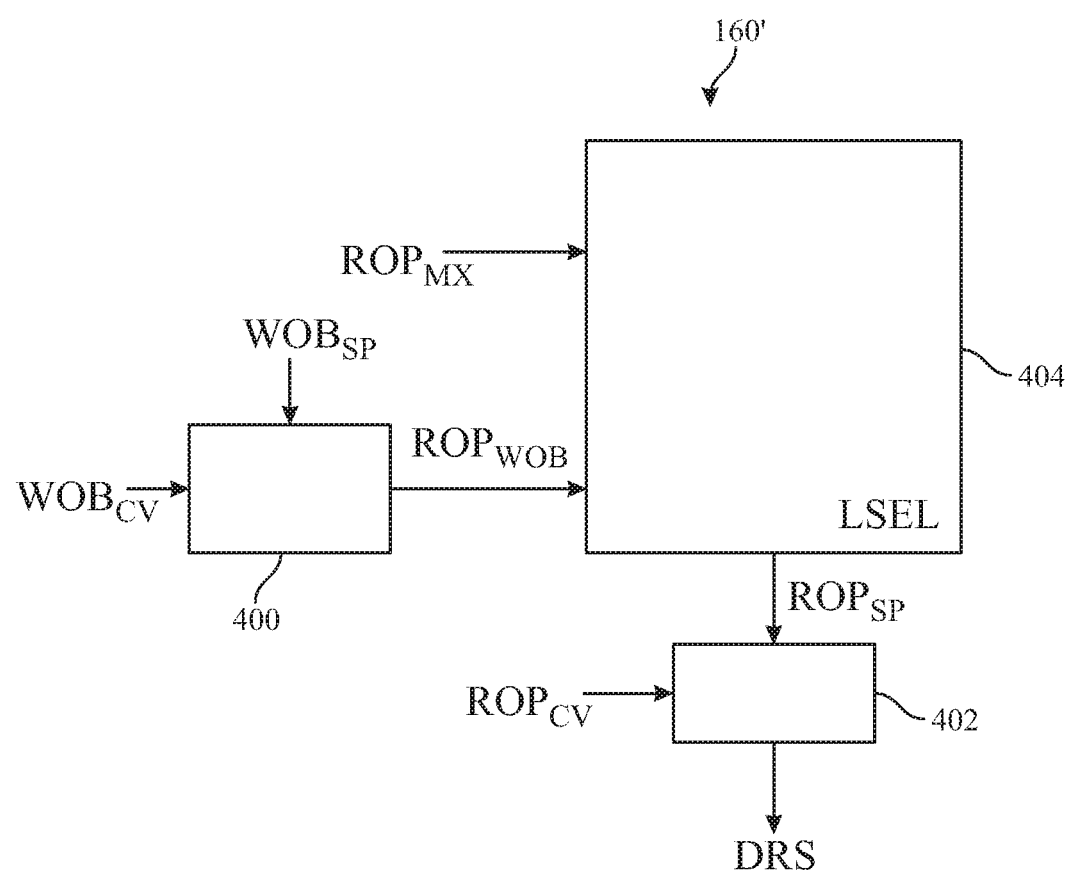
FIG. 5 is a representation of an embodiment of a drilling rig control configuration in which methods of the present disclosure may be implemented, in accordance with an embodiment.

Referring now to FIG. 5, an embodiment of a drilling rig control configuration 160' is provided in which methods of the present disclosure may be implemented, in accordance with an example embodiment. The drilling rig control configuration 160' may comprise a Weight-On-Bit (WOB) PID controller 400 and a Rate-Of-Penetration (ROP) controller 402. The ROP controller 402 may be configured to adjust Drum Rotation Speed (DRS) of the drawworks to maintain the measured ROP (ROP$_{CV}$) at a desired setpoint value (ROP$_{SP}$). The ROP setpoint (ROP$_{SP}$) may be selected by a ROP setpoint selector 404 as the minimum of two signals—an operator entered maximum ROP value (ROP$_{MX}$) and the output (ROP$_{WOB}$) of the Weight-On-Bit (WOB) PID controller 400. The WOB PID controller 400 adjusts its output (ROP$_{WOB}$) to maintain the measured WOB (WOB$_{CV}$) at a desired setpoint value (WOB$_{SP}$). The net effect of this arrangement is that the WOB is controlled by adjusting the ROP setpoint (ROP$_{SP}$) unless the required ROP setpoint exceeds the ROP maximum limit (ROP$_{MX}$), in which case the ROP$_{SP}$ is limited to the value of ROP$_{MX}$. When the ROP maximum limit is selected by the ROP setpoint selector 404 the rig is said to be operating in an ROP mode. When the output of the WOB PID controller 400 is selected, the rig 102 is said to be operating in a WOB mode.

It is noted that the input to the WOB PID controller 400 is a WOB-based input (i.e., WOB$_{CV}$), whereas the output of the WOB PID controller 400 is a ROP-based output (i.e., ROP$_{WOB}$). A factor for converting WOB-based signals to ROP-based signals of the WOB PID controller may be included within the gain (Kc) of the WOB PID controller 400.

It is also contemplated that the ROP controller 402 may also be a PID controller.

Figure 3:
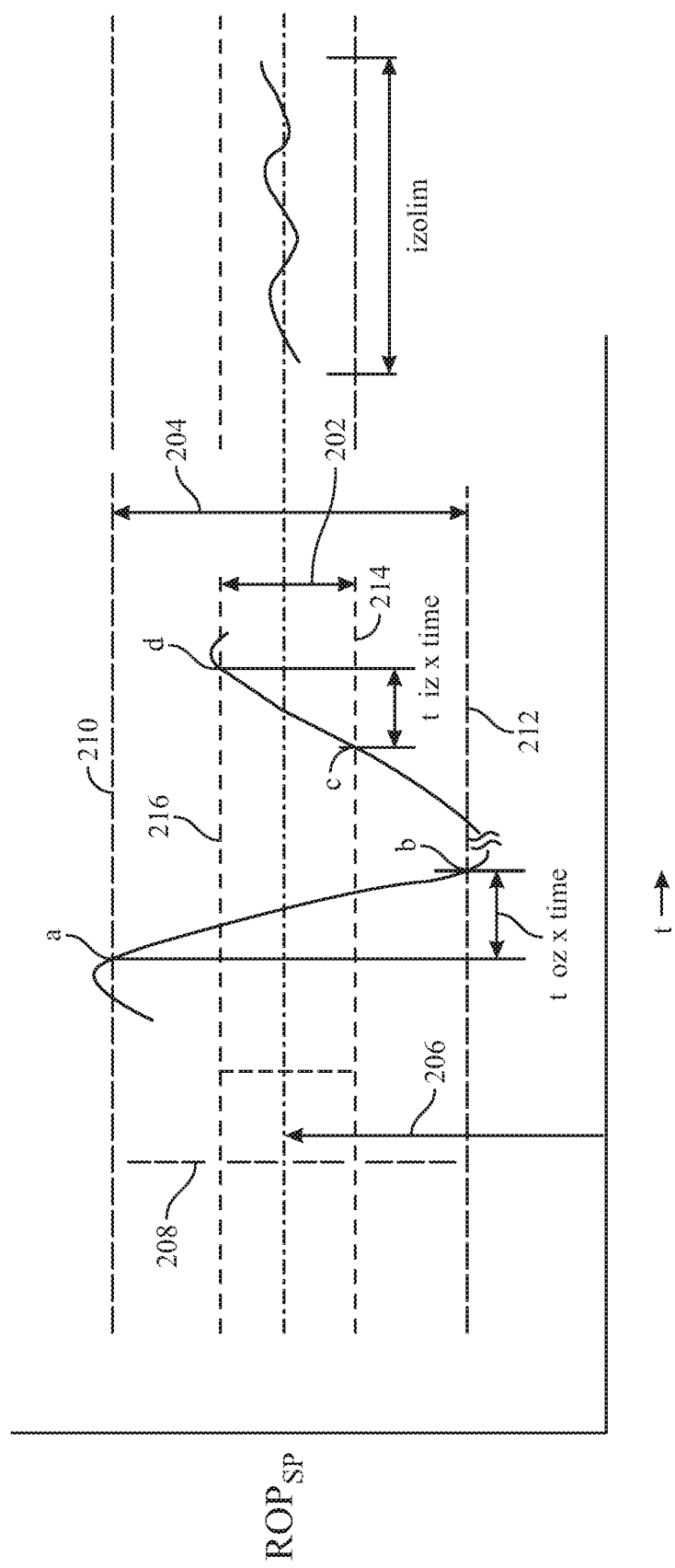
FIG. 3 is a graphical representation of components of the systems and methods of the present disclosure, according to an embodiment.

Referring now to FIGS. 3 and 5, in various embodiments, the DRCAT algorithm may be implemented to automatically tune the WOB PID controller 400. For example the DRCAT algorithm may first establish an inner zone 202 and an outer zone 204 about the ROP setpoint, which zones may be centered around a moving average value 206 of the ROP setpoint, and their respective widths may be defined as multiples of the moving standard deviation:

$$movavg_k = mu*ROPsp_k + (1-mu)*movavg_{k-1}$$

$$movsmm_k = mu*(ROPsp_k)^2 + (1-mu)*movsmm_{k-1}$$

$$movstd_k = \sqrt{movsmm_k - (movavg_k)^2}$$

$$ozhilim_k = movavg_k + ozwfac*movstd_k$$

$$ozlolim_k = movavg_k - ozwfac*movstd_k$$

$$izhilim_k = movavg_k + izwfac*movstd_k$$

$$izlolim_k = movavg_k - izwfac*movstd_k$$

with:
movavg$_k$=moving average ROP setpoint
movsmm$_k$=moving average squared ROP setpoint
movstd$_k$=moving standard deviation ROP setpoint
ROPsp$_k$=ROP setpoint
mu=moving average memory parameter
ozhilim$_k$=outer zone high limit
ozlolim$_k$=outer zone low limit
ozwfac=outer zone width factor
izhilim$_k$=inner zone high limit
izlolim$_k$=inner zone low limit
izwfac=inner zone width factor Referring to FIG. 3, for example, at a point in time (k) during the drilling operation, the magnitudes of the moving average of the monitored ROP (ROP$_{SP}$) (which in effect may be the output (ROP$_{WOB}$) of the WOP PID controller 400) and the corresponding moving standard deviation of the monitored ROP (ROP$_{SP}$) may be calculated. For purposes of example only, the inner zone 202 may be defined with an inner zone width factor selected to be 2 and the outer zone 204 may be defined with an outer zone width factor selected to be 5. These numbers correspond with the multiples of the moving standard deviation which define the widths of the inner and outer zones 202, 204, respectively. A unit of the moving standard deviation 208 is represented by a hashmark in FIG. 3. Accordingly, the inner zone 202 extends by two units of the moving standard deviation 208 above the moving average of ROP$_{SP}$ and extends by two units of the moving standard deviation below the moving average of ROP$_{SP}$. Likewise, the outer zone 204 extends 5 units of the moving standard deviation 208 above the moving average of ROP$_{SP}$ and extends 5 units of the moving standard deviation 208 below the moving average ROP$_{SP}$. Of course, it is contemplated that in different applications, these numbers may differ from those of the example embodiment been described herein.

Figure 4:
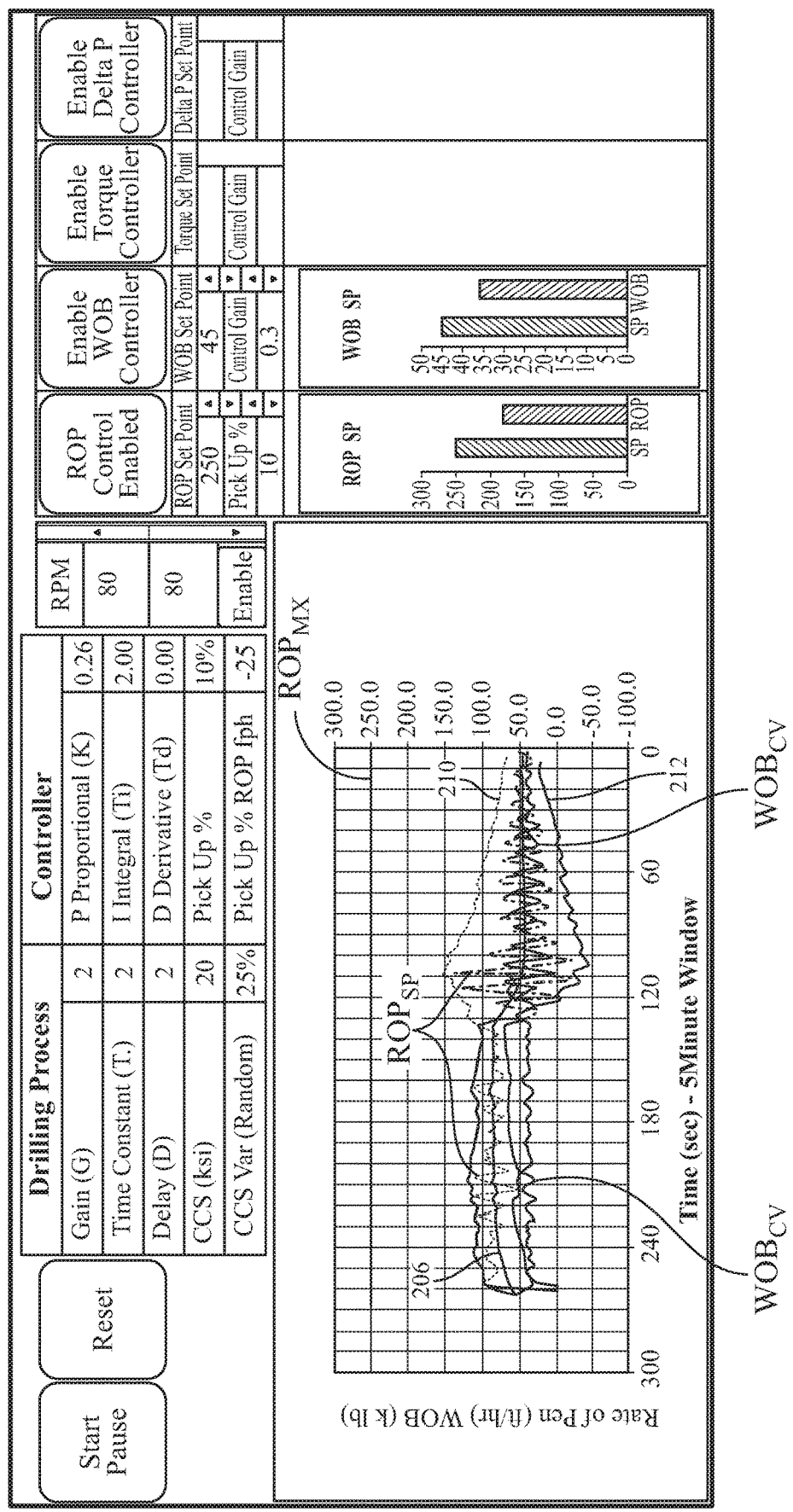
FIG. 4 is a representation of a screen display of operating parameters of a simulated drilling operation when impacted by a change of a condition in a formation, with an implementation of the systems and methods of the present disclosure, according to an embodiment.

It is noted that although the moving average ROP setpoint, and the higher and lower limits 216, 214 of the inner zone 202 and the higher and lower limits 210, 212 of the outer zone 204 are shown as straight lines in FIG. 3, they are usually other than straight lines, such as shown in FIG. 4 for the higher and lower limits 210, 212 of the outer zone 204.

The calculation of the inner and outer zones described above takes place at each time interval. However, the adjustment of the WOB PID controller gain takes place only if the rig is in WOB mode. One way to check for WOB mode is to see if the following condition is true:

$$(|ROP_{SP,k} - ROP_{WOB,k}| < \text{rsptol}) \text{ AND } (|ROP_{SP,k-1} - ROP_{WOB,k-1}| < \text{rsptol})$$

Here rsptol is a small tolerance.

In various embodiments, if the rig is in WOB mode, the DRCAT algorithm may be configured to adjust the gain of the WOB PID controller based on three rules:

Rule 1. If the ROP setpoint crosses the outer zone too quickly (if it rises above ozhilim$_k$ and falls below ozlolim$_k$ (or vice versa) within ozcdel control intervals), decrease the WOB controller gain by a large factor (ozgcf);

Rule 2. If the ROP setpoint crosses the inner zone too quickly (if it rises above izhilim$_k$ and falls below izlolim$_k$ (or vice versa) within izcdel control intervals), decrease the WOB controller gain by a small factor (izgcf);

Rule 3. If the ROP setpoint remains too long within the inner zone (if it stays between izhilim$_k$ and izlolim$_k$ for more than izolim control intervals), increase the WOB controller gain by a small factor (izogif), with:
ozcdel=outer zone cross delta time
ozgcf=outer zone cross gain cut factor
izcdel=inner zone cross delta time
izgcf=inner zone cross gain cut factor
izolim=inner zone occupancy limit
izogif=inner zone occupancy gain increase factor Referring back to FIG. 3 and in regard to the first rule, during a drilling operation, should a ROP set point (ROP$_{SP}$) (which in effect is the output (ROP$_{WOB}$)) cross the higher limit 210 of the outer zone 204 at the value and time of point a and then cross the lower limit 212 of the outer zone 204 at the value and time of point b, the DRCAT algorithm may be configured to establish a measured time interval for the aforementioned event (which appears as t oz x time in FIG. 3) and compare that measured time interval against the value set/predetermined for outer zone cross delta time (ozcdel). If the measured/monitored value of the t oz x time is less than the predetermined value for ozcdel, then the WOB controller gain is decreased by a large factor (ozgcf).

Likewise and in regard to the second rule, should ROP set point (ROP$_{SP}$) (which in effect is the output (ROP$_{WOB}$)) cross the lower limit 214 of the inner zone 202 at the value and time of point c and then cross the upper limit 216 of the inner zone 204 at the value and time of point d, the DRCAT algorithm may be configured to establish a measured time interval for the aforementioned event (which appears as t iz x cross time in FIG. 3) and compare that measured time interval against the value set/predetermined for the inner zone cross delta time (izcdel). If the measured/monitored value of the t iz x time is less than the predetermined value for izcdel, then the WOB controller gain is decreased by a smaller factor (izgcf) (in other words, the outer zone cross gain cut factor is greater than the inner zone cross gain cut factor).

With regard to the third rule and still referring to FIG. 3, should the set point for ROP (ROP$_{SP}$) remain within the higher and lower limits 216, 214 of the inner zone 202 for a detected time span exceeding a predetermined/set value for the inner zone occupancy limit (izolim), the DRCAT algorithm may be configured to increase the WOB controller gain by a small factor (izogif).

By such arrangement and in application of the third rule, responsiveness of the WOB controller 400 may be enhanced during circumstances when current tuning of the WOB controller comports well with the ongoing drilling operation. The increased gain enhances controller performance (i.e., how well it maintains the controlled variable at or about the setpoint). However should the drilling conditions and/or the condition of the drilling equipment change, as they often do, smaller increases will be counteracted by smaller decreases in gain of the WOB controller if those changes cause the ROP set point to cross only the higher and lower limits of the inner zone within a prescribed time limit as previously described. Changes of a larger magnitude will be counteracted by larger decreases in gain of the WOB controller when those larger changes cause the ROP set point (ROP$_{SP}$) to cross the higher and lower limits of the outer zone in another prescribed time limit as previously described. If the time limits of those crossings extend beyond the corresponding time limits, then the gain is not adjusted under either of Rules 1 and 2. The changes in the measured ROP set point values should be sufficiently rapid to indicate that a condition of instability may be arising.

In some circumstances, the occurrence of the smaller decreases in gain from the second rule will follow decreases in gain from execution of the first rule, which may provide a graduated (stepped) decrease in gain of the WOB controller 400, which further promotes controller stability. In execution of all three rules, the WOB controller may become self-tuning (automatically tuned) with a balance of a need for control performance (how well the controller keeps a control variable at its setpoint) and control robustness (how much a process variation can be tolerated before the controller becomes unstable).

It is to be understood that should the DRCAT algorithm as described above call for a change in gain, the change may be communicated to the WOB PID controller 400 as a change in its gain Kc.

By way of a simulation, FIG. 4 demonstrates an application of aspects of the scenario described in reference to FIG. 2. Again the simulated control system exhibits being initially stable while drilling through a rock formation with a hardness of 10 ksi. However, when the rock hardness changes to 20 ksi in the simulation, the DRCAT algorithm counteracts a developing unstable behavior (i.e., rapid and significant oscillations in ROP values) and decreases the WOB controller gain from 1.0 to 0.26 to stabilize the controller system.

The values of the DRCAT algorithm parameters used for the simulation in FIG. 4 are provided in Table 1.

TABLE 1

DRCAT Algorithm Parameters

| | | |
|---|---|---|
| mu | 0.05 | moving average memory parameter |
| ozwfac | 2 | outer zone width factor |
| ozcdel | 10 | outer zone cross delta time |
| izwfac | 1 | inner zone width factor |
| izcdel | 10 | inner zone cross delta time |
| izolim | 10 | inner zone occupancy limit |
| ozcgcf | 0.5 | outer zone cross gain cut factor |
| izcgcf | 0.8 | inner zone cross gain cut factor |
| izogif | 1.25 | inner zone occupancy gain increase factor |
| rsptol | 1 | tolerance for detecting rop mode |

As shown in FIG. 4, the DRCAT algorithm stabilizes the WOB controller during the simulated change in rock hardness of 10 to 20 ksi by detecting characteristics of the unstable behavior and by reducing the WOB controller gain responsively. In what is represented in FIG. 4, it is to be noted that simulation included a construction of a PI controller having only proportional and integral control factors.

Going from left to right of the chart shown in FIG. 4, while the simulated drilling operation drilled through the first formation of a rock hardness 10 ksi, the $WOB_{CV}$ values tracked closely about the value of the original WOB setpoint ($WOB_{SP}$), and initially the $ROP_{SP}$ values tended to oscillate to a slightly greater but acceptable degree about a moving average of the $ROP_{SP}$ values. The simulated control system was initially exhibiting stable characteristics. Aspects of the DRCAT algorithm that was implemented in the simulation established an outer zone high limit 210 above the moving average of $ROP_{SP}$ values and established an outer zone low limit 212 below the moving average of the $ROP_{SP}$ values in a manner as previously described. The outer zone high and low limits 210, 212 may be established as a function of the moving average of the $ROP_{SP}$ values together with an addition and subtraction of a multiple of the moving standard deviation.

As further shown in FIG. 4, as one further progresses from left to right in the chart shown in FIG. 4, the simulated drill bit enters the formation of the greater rock hardness 20 ksi, whereupon the simulated rate of progress decreases and the measured values of $ROP_{SP}$ undergo a series of abrupt and significantly larger oscillations which cross the inner zone high limit and the inner zone low limit within a prescribed (short) time interval, which event triggered a decrease in the controller gain to return the control system to a stabilized operating condition. Being based on moving averages, the outer zone high and low limits 210, 212 tended to converge as the oscillations of the measured $ROP_{SP}$ values recovered and converged about the running average of $ROP_{SP}$ values. It is noted that only the outer zone limits 210, 212 are plotted in FIG. 4.

The simulation used to produce the images presented in FIG. 2 and FIG. 4 were constructed using an Excel spreadsheet. It implements the rig control structure of FIG. 5, with a rig simulation model that takes the drum rotational speed (DRS) and outputs the measured ROP and WOB.

It is to be noted that the updated tuning parameters computed by the DRCAT algorithm can either be presented to the drilling rig operator as recommendations on a display screen, in which case the operator would need to enter them manually, or they can be written directly to the PID controller hardware and/or operating instructions.

It is also noted that the DRCAT algorithm can be applied to other PID controllers on the drilling rig such as those dedicated to controlling torque, delta pressure, and other operating parameters.

It is further noted that the DRCAT algorithm can be applied to any PID controller used on any process, and that straightforward transformations can be used to compute the appropriate tuning values for other PID controller forms (parallel, etc.).

While aspects of the present disclosure may be susceptible to various modifications and alternative forms, the exemplary embodiments discussed above have been shown by way of example. It should again be understood that the disclosure is not intended to be limited to the particular embodiments disclosed herein. Indeed, the present disclosure includes all modifications, equivalents, and alternatives falling within the spirit and scope of the appended claims.

What is claimed is:

1. A method of automatically tuning a Proportional-Integral-Derivative (PID) controller configured to control toward a desired process value by manipulating a second variable, comprising:

repetitively measuring a value of the desired process value during a time interval;

from the repetitively measuring, determining a moving average of the measured values and determining a moving standard deviation of the measured values;

defining an outer zone of measured values with the determined moving average and a first plurality of the determined moving standard deviation, the outer zone including an outer zone high limit and an outer zone low limit centered about the determined moving average and including an outer zone width that is a determined factor of the determined moving standard deviation;

defining an inner zone of measured values with the determined moving average and a second plurality of the determined moving standard deviation, the first plurality being greater in number than second plurality, the inner zone including an inner zone high limit and an inner zone low limit centered about the determined moving average and including an inner zone width factor that is a determined factor of the determined moving standard deviation, wherein the outer zone width factor is greater in magnitude than the magnitude of the inner zone width factor;

monitoring the measured values for the occurrence of a first statistical event with respect to the outer zone and adjusting a gain of the controller by a first factor associated with the outer zone gain upon detection of the first statistical event;

monitoring the measured values for the occurrence of a second statistical event with respect to the inner zone and adjusting the gain of the controller by a second factor associated with the inner zone gain upon detection of the second statistical event;

wherein the first factor differs from the second factor;

whereby the controller is automatically tuned to provide stability for the desired process value.

2. The method of claim 1, wherein the monitoring the measured values for the occurrence of the first statistical event comprises:

measuring a duration of a first time interval for when a measured value measures above an upper limit of the outer zone to when another measured value measures below a lower limit of the outer zone;

comparing the duration of the first measured time interval against a duration of a first predetermined time interval; and should the duration of the first measured time interval be less than the duration of the first predetermined time interval, adjusting the gain of the controller by the first factor.

3. The method of claim 2, wherein the monitoring the measured values for the occurrence of the second statistical event comprises:

measuring a duration of a second time interval for when a measured value measures above an upper limit of the inner zone to when another measured value measures below a lower limit of the inner zone;

comparing the duration of the second measured time interval against a duration of a second predetermined time interval; and should the duration of the second measured time interval be less than the duration of the second predetermined time interval, adjusting the gain of the controller by the second factor.

4. The method of claim 3, wherein the first factor and second factor decrease the gain of the controller, the decrease in gain of the first factor being greater than the decrease in gain of the second factor.

5. The method of claim 4, wherein the upper limit of the outer zone is determined by an addition of the first plurality to the determined moving average and the lower limit of the outer zone is determined by a subtraction of the first plurality from the determined moving average.

6. The method of claim 5, wherein the upper limit of the inner zone is determined by an addition of the second plurality to the determined moving average and the lower limit of the inner zone is determined by a subtraction of the second plurality from the determined moving average.

7. The method of claim 6, further comprising:
further monitoring the measured values with respect to the inner zone;
the further monitoring comprising:
detecting a third time interval during which measured values remain within the upper and lower limits of the inner zone; and
comparing the duration of the detected third interval of time to a duration of a third predetermined time interval; and
upon a finding that the duration of the detected third interval of time is greater than the duration of the third predetermined time interval, increasing the gain of the controller by a third factor associated with the inner zone gain.

8. The method of claim 7, wherein the increase in gain of the third factor is smaller in magnitude than the magnitude of the decrease in gain of the first factor.

9. The method of claim 1, wherein the desired process value represents a rate of progress (ROP) of a drilling rig and the second variable represents a weight on bit (WOB) of the drilling rig.

10. A controller system, comprising:
a Proportional-Integral-Derivative (PID) controller configured to control toward a desired process value by manipulating, a second variable;
an arrangement in communication with the controller to repetitively measure a value of the desired process value;
the controller being configured to execute a routine that:
determines a moving average of the measured values;
determines a moving standard deviation of the measured values;
defines an outer zone of measured values with the determined moving average and a first plurality of the determined moving standard deviation, the outer zone including an outer zone high limit and an outer zone low limit centered about the determined moving average and including an outer zone width that is a determined factor of the determined moving standard deviation;
defines an inner zone of measured values with the determined moving average and a second plurality of the determined moving standard deviation, the first plurality being greater in number than the second plurality, the inner zone including an inner zone high limit and an inner zone low limit centered about the determined moving average and including an inner zone width factor that is a determined factor of the determined moving standard deviation, wherein the outer zone width factor is greater in magnitude than the magnitude of the inner zone width factor;
monitors the measured values for the occurrence of a first statistical event with respect to the outer zone and adjusting a gain of the controller by a first factor associated with the outer zone gain upon detection of the first statistical event;
monitors the measured values for the occurrence of a second statistical event with respect to the inner zone and adjusting the gain of the controller by a second associated with the inner zone gain factor upon detection of the second statistical event;
wherein the first factor differs from the second factor;
whereby the controller is automatically tuned to provide stability for the desired process value.

11. The system of claim 10, wherein in detecting the first statistical event the controller is configured to execute a routine that:
measures a duration of a first time interval for when a measured value may measure above an upper limit of the outer zone to when another measured value may measure below a lower limit of the outer zone;
compares the duration of the first measured time interval against a duration of a first predetermined time interval; and
should the duration of the first measured time interval be less than the duration of the first predetermined time interval, adjusting the gain of the controller by the first factor.

12. The system of claim 11, wherein in the detecting the second statistical event the controller is configured to execute a routine that:
measures a duration of a second time interval for when a measured value may measure above an upper limit of the inner zone to when another measured value may measure below a lower limit of the inner zone;
should the duration of the second measured time interval be less than the duration of the second predetermined time interval, adjusting the gain of the controller by the second factor.

13. The system of claim 12, wherein the controller is further configured to execute a routine that:
monitors the measured values with respect to the inner zone to detect a third time interval duration during which measured values remain within the upper and lower limits of the inner zone; and
compares the duration of the detected third interval of time to a duration of a third predetermined time interval; and
upon a finding that the duration of the detected third interval of time is greater than the duration of the third predetermined time interval, increases the gain of the controller by a third factor.

14. The system of claim 13, wherein the first factor and second factor decrease the gain of the controller, the magnitude of decrease in gain of the first factor being greater than the magnitude of decrease in gain of the second factor.

15. The system of claim 14, wherein the upper limit of the outer zone is determined by an addition of the first plurality to the determined moving average and the lower limit of the outer zone is determined by a subtraction of the first plurality from the determined moving average.

16. The system of claim 15, wherein the upper limit of the inner zone is determined by an addition of the second plurality to the determined moving average and the lower limit of the inner zone is determined by a subtraction of the second plurality from the determined moving average.

17. The system of claim 16, wherein the increase in gain of the third factor is smaller in magnitude than the decrease in gain of the first factor.

18. The system of claim 10, wherein the desired process value represents a rate of progress (ROP) of a drilling rig and the second variable represents a weight on bit (WOB) of the drilling rig.

19. The system of claim 18, wherein the controller is configured to produce a displayable control gain recommendation.

20. The system of claim 19, wherein the controller is linked to a driver of the drilling rig, whereby the output of the controller is implemented automatically.

* * * * *